Figure 1:
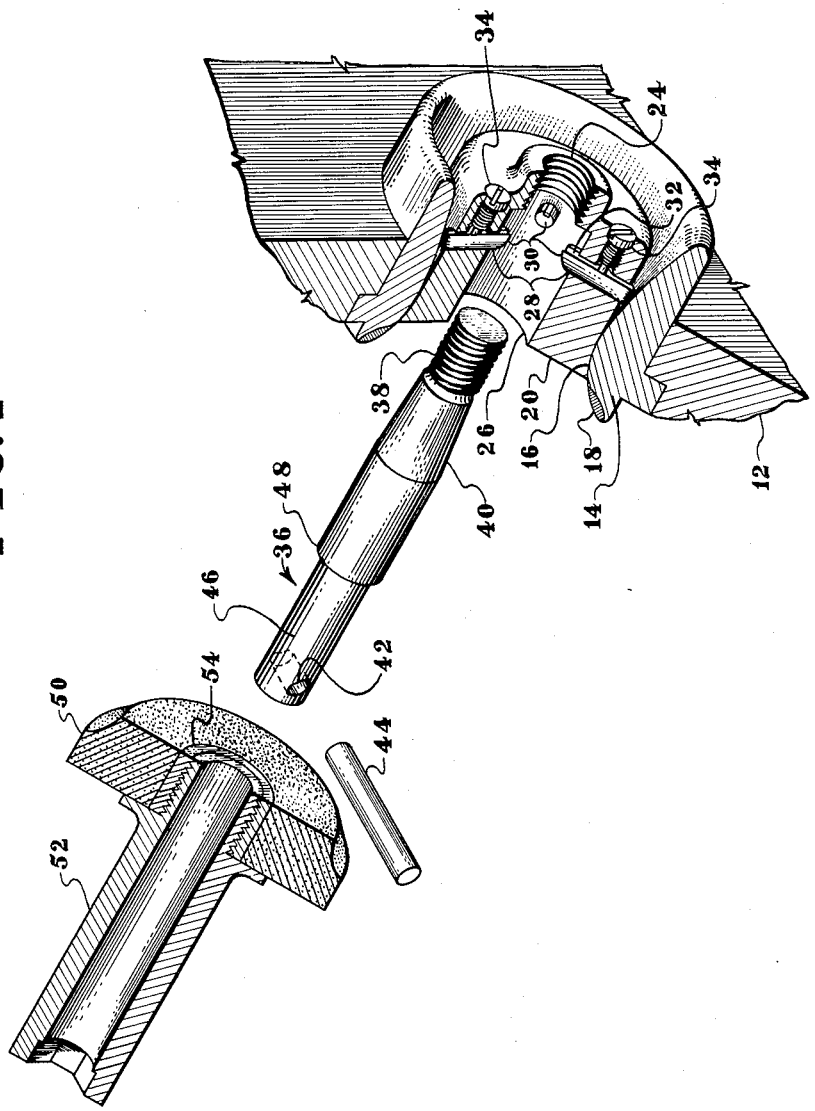

Dec. 6, 1955  L. W. STANFIELD  2,725,695
RADIUS PILOT GUIDE FOR RESEATING VALVE SEATS
Filed Aug. 8, 1952  2 Sheets-Sheet 1

INVENTOR.
LYSLE W. STANFIELD
BY
George E. Pearson
ATTORNEYS

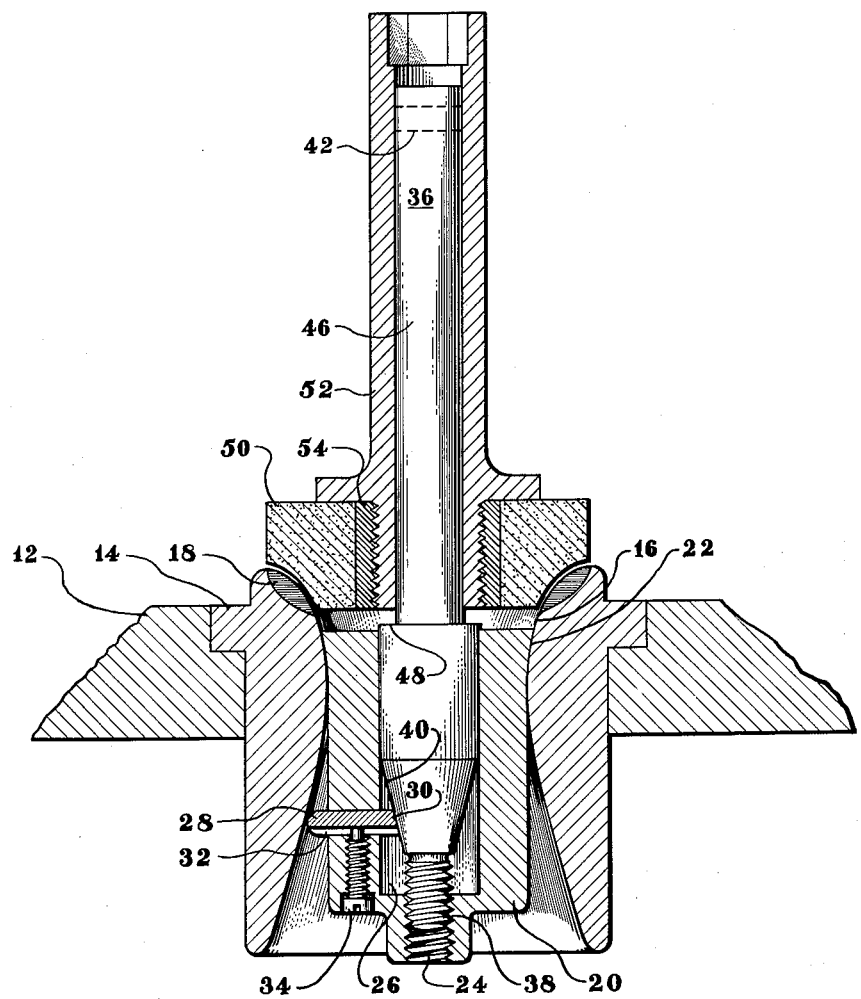

United States Patent Office 2,725,695
Patented Dec. 6, 1955

2,725,695

RADIUS PILOT GUIDE FOR RESEATING VALVE SEATS

Lysle W. Stanfield, Long Beach, Calif.

Application August 8, 1952, Serial No. 303,455

2 Claims. (Cl. 51—241)

(Granted under Title 35, U. S. Code (1952), sec. 266)

The invention described herein may be manufactured and used by or for the Government of the United States of America for governmental purposes without the payment of any royalties thereon or therefor.

This invention relates to expansible centering guides and more particularly to a centering guide for grinding, reaming, indicating and other tools for reseating or checking valve seats especially those used with inverted valve stems.

Many types of pilots have been proposed for use in guiding reaming or grinding tools, but these have utilized the valve stem guide for centering the tool with respect to the valve seat. Therefore they were not usable with the blind valve seats used with inverted valve stems. Other devices have been proposed for blind valve seats, but they have not been universal in application, and particularly are not adapted for use on radius type valve seats utilized in conjunction with inverted valves on certain steam turbines. Other prior methods involved hand lapping with machined plugs and grinding compound which was inaccurate, tedious and expensive.

One object of the present invention is to overcome the disadvantages enumerated above and provide a universal centering guide for power operated reseating apparatus.

Another object of the present invention is to provide a centering guide for reseating blind valve seats which may also be utilized for checking the trueness of the seat in connection with an indicating device before, during or after the reseating process.

Briefly stated, one preferred embodiment of the present invention consists of a substantially cylindrical pilot body having a flared upper portion adapted to engage the valve seat adjacent the smallest diameter portion of the recess below the seating surface. The body is provided with a threaded bore at one end which engages the threaded end of a guide stem. A plurality of pins extend radially through the body into an enlarged bore and are provided with bevelled ends which engage a tapered portion of the guide stem which is also provided with a shoulder for rotatably supporting a shaped grinding wheel, reamer or indicator. The guide stem when threaded into the pilot body engages the pins forcing them outwardly into engagement with the lower flared portion of the valve seat to center and firmly engage the pilot body with respect to the valve seat. The grinding, reaming or indicating tool may be slipped over the shank of the guide stem and rotated for its intended purpose of reseating or checking the valve seat.

Other objects and many of the attendant advantages of this invention will be readily appreciated as the same becomes better understood by reference to the following detailed description when considered in connection with the accompanying drawings wherein:

Fig. 1 is an exploded view illustrating one preferred embodiment of the present invention in conjunction with a shaped grinder and a radius valve seat insert; and Fig. 2 is an assembled view in section of the device shown in Fig. 1.

Referring now to the drawings in detail, the numeral 12 indicates a portion of a steam turbine (broken away) in which the valve seat 14 is inserted. The face 16 of the valve seat 14 is turned on a radius and provided with a hardened seating portion 18.

A substantially cylindrical pilot body 20 is provided with a flared or enlarged upper portion 22 adapted to engage the curved face 16 of the valve seat 14 below the seating portion 18.

A threaded bore 24 and an enlarged bore 26 extend axially through the pilot body 20 and a plurality of pins 28 (preferably three uniformly spaced) extend radially through the pilot body 20 and are provided with bevelled ends 30 within the bore 26.

Pins 28 are also provided with longitudinal slots or keyways 32 which are engaged by the ends of screws 34 forming keys for maintaining the pins in the proper position, but permitting radial movement.

A guide stem 36 is provided with a threaded end 38 for engagement with the threaded bore 24 and a tapered frusto conical portion 40 for engaging the bevelled ends 30 of pins 28. A transverse diametrical bore 42 is adapted to receive a removable handle 44 (shown in Fig. 1) for rotation of the guide stem.

Guide stem 36 has a shank 46 of reduced diameter forming a shoulder 48 which rotatably supports a reseating or indicating tool such as the shaped grinding stone 50 mounted on a sleeve or holder 52 on which it is retained by a threaded bushing 54. The top of holder 52 has a hexagonal or other recess of non-circular shape for engagement by a suitable power drive (not shown).

*Operation*

In the operation of the device the pilot guide 20 is inserted in the valve seat 14 until the flared portion 22 engages the face 16 just below the seating portion 18, and the guide stem 36 is threaded into bore 24 until pins 28 firmly engage the flared lower portion of the valve seat 14. If desired, a suitable indicator (not shown) may be slipped on shank 46 and rotated to check the trueness of the seating surface 18. Then the shaped grinding stone 50 on its holder 52 is slipped on the shank 46 and rotated by a suitable power tool until the seat is refinished. At any time during or after the grinding the stone 50 may be removed and the seat checked without removing the guide stem 36 or pilot body 20.

The pilot body 20 may be provided in different shapes and sizes to fit various similar valve seat inserts and the guide stems may also be supplied with different diameter shanks to accommodate different types of grinding stones.

Obviously many modifications and variations of the present invention are possible in the light of the above teachings. It is therefore to be understood that within the scope of the appended claims the invention may be practiced otherwise than as specifically described.

What is claimed is:

1. Apparatus for reseating of pilotless valve seats having a curved upper seat portion and a downwardly and outwardly flared lower portion comprising a pilot body adapted to be inserted in the valve seat, said body having an enlarged portion for engagement with the curved portion of said seat whereby the body is prevented from passing therethrough, said body having a portion extending downwardly from said enlarged portion, said body having a central bore terminating in an inner threaded portion of reduced diameter, a plurality of pins carried by said reduced body portion for sliding movement radially thereof, one end of each of said pins extending into said bore and the other end of the pin being engageable with said flared portion, a guide stem having a threaded extremity in threaded engagement with said threaded portion of said pilot body, a tapered portion on said stem engageable with said pins for forcing the pins into engagement with said flared portion of the valve seat as the stem is screwed into the pilot body, a grinding wheel adapted to resurface the seat of the valve, and means for mounting said wheel for rotation on said stem and in grinding engagement with said seat.

2. Apparatus for reseating of a pilotless valve seat having an upper seat portion and an outwardly flared lower surface portion comprising, a radius pilot body adapted to be inserted in the valve seat, said body having a central bore terminating in an inner threaded portion of reduced diameter, said body having an enlarged radius portion in engagement with the seat whereby the body is prevented from passing therethrough, said body having a reduced portion extending downwardly from said engaged radius portion, a plurality of identical pins carried by said reduced body position for sliding movement diametrically thereof, one end of each of said pins extending into said bore and the other end of the pin being engageable with said flared surface portion, a stem having a threaded extremity in threaded engagement with said threaded portion of said pilot body, a taper portion on said stem engageable with said pins for forcing the pins into said engagement with said flared surface portion of the valve seat as the stem is screwed into the pilot body, a grinding wheel adapted to resurface the seat of the valve, and means for mounting said wheel for rotation on said stem and in grinding engagement with said seat.

References Cited in the file of this patent

UNITED STATES PATENTS

| | | |
|---|---|---|
| 1,220,399 | Cowell | Mar. 27, 1917 |
| 1,471,458 | Gage | Oct. 23, 1923 |
| 1,532,653 | Davison | Apr. 7, 1925 |
| 1,636,560 | Hall | July 19, 1927 |
| 1,666,624 | Lane | Apr. 17, 1928 |
| 1,748,126 | Hall | Feb. 25, 1930 |
| 1,948,792 | Lee | Feb. 27, 1934 |
| 2,369,319 | Smith | Feb. 13, 1945 |
| 2,556,229 | Stanfield | June 12, 1951 |

FOREIGN PATENTS

| | | |
|---|---|---|
| 201,515 | Great Britain | Mar. 27, 1924 |